US009065794B2

(12) United States Patent
Smith et al.

(10) Patent No.: US 9,065,794 B2
(45) Date of Patent: Jun. 23, 2015

(54) SYSTEMS AND METHODS FOR PROVIDING DOMAIN NAME SUGGESTIONS

(71) Applicants: David Smith, Reston, VA (US); Milind Sarambale, Reston, VA (US); Souheil Ben Yacoub, Reston, VA (US)

(72) Inventors: David Smith, Reston, VA (US); Milind Sarambale, Reston, VA (US); Souheil Ben Yacoub, Reston, VA (US)

(73) Assignee: VERISIGN, INC., Reston, VA (US)

(*) Notice: Subject to any disclaimer, the term of this patent is extended or adjusted under 35 U.S.C. 154(b) by 248 days.

(21) Appl. No.: 13/683,160

(22) Filed: Nov. 21, 2012

(65) Prior Publication Data

US 2014/0143331 A1 May 22, 2014

(51) Int. Cl.

| | |
|---|---|
| ***G06F 15/16*** | (2006.01) |
| ***H04L 29/08*** | (2006.01) |
| ***G06F 17/27*** | (2006.01) |
| ***G06F 17/28*** | (2006.01) |
| ***H04L 29/12*** | (2006.01) |

(52) U.S. Cl.

CPC ............ *H04L 67/02* (2013.01); *G06F 17/2795* (2013.01); *G06F 17/2881* (2013.01); *H04L 29/12641* (2013.01); *H04L 61/3025* (2013.01)

(58) Field of Classification Search

CPC ..................... H04L 61/2025; H04L 29/12641; H04L 61/3025; G06F 17/30

USPC .................................................. 709/203, 204

See application file for complete search history.

(56) References Cited

U.S. PATENT DOCUMENTS

| | | | | |
|---|---|---|---|---|
| 6,298,341 | B1 | 10/2001 | Mann et al. | |
| 7,305,394 | B2 | 12/2007 | Fellman | |
| 7,627,628 | B2 | 12/2009 | King et al. | |
| 2002/0103820 | A1* | 8/2002 | Cartmell et al. | 707/500 |
| 2004/0098375 | A1* | 5/2004 | DeCarlo, III | 707/3 |
| 2004/0167982 | A1* | 8/2004 | Cohen et al. | 709/226 |
| 2009/0265415 | A1 | 10/2009 | Harry | |
| 2010/0042622 | A1* | 2/2010 | Matkowsky | 707/6 |
| 2010/0058210 | A1* | 3/2010 | Johnson | 715/764 |
| 2010/0169492 | A1* | 7/2010 | Lee | 709/226 |
| 2010/0325250 | A1 | 12/2010 | Colosi | |
| 2011/0258237 | A1 | 10/2011 | Thomas | |
| 2012/0084281 | A1 | 4/2012 | Colosi | |
| 2012/0096019 | A1* | 4/2012 | Manickam et al. | 707/767 |

* cited by examiner

*Primary Examiner* — Liangche A Wang
*Assistant Examiner* — Cheikh Ndiaye
(74) *Attorney, Agent, or Firm* — MH2 Technology Law Group, LLP

(57) ABSTRACT

Systems and methods are provided for providing domain name suggestions based on user preferences and terms extracted from one or more information sources. Terms may be continuously extracted from information sources and used to generate domain name suggestions. Generated domain name suggestions may then be delivered to customers. The systems and methods may utilize customer preferences in providing the domain name suggestions, such as preferences as to information sources or topics of interest. The systems and methods may be self-learning, taking historical domain name registration information into account to improve the domain name suggestions.

21 Claims, 14 Drawing Sheets

300

Feeds ▽    Keywords ▽

👤 John Doe

Manage RSS Feeds *(3 feeds)*

⚙ Import Google Reader Feeds

Add New RSS Feed

| Enter RSS Feed URL | —Select Category— ⬍ | —Set # Keywords— ⬍ | Add RSS Feed |

☐ Other ③        # Keywords ( 1 ⬍ )    ✎

Display [ 10 ⬍ ] feeds per page        Search: [         ]

⚙ Foreclosure News                                  1    ⊗  ✎
⚙ Foreclosures - Latest Articles                    1    ⊗  ✎
⚙ ForeclosureBlogs                                  1    ⊗  ✎

Showing 1 to 3 of 3 feeds              ← Previous | 1 | Next →

[ Delete Feeds ]                                    [ Get Domain Suggestions ]

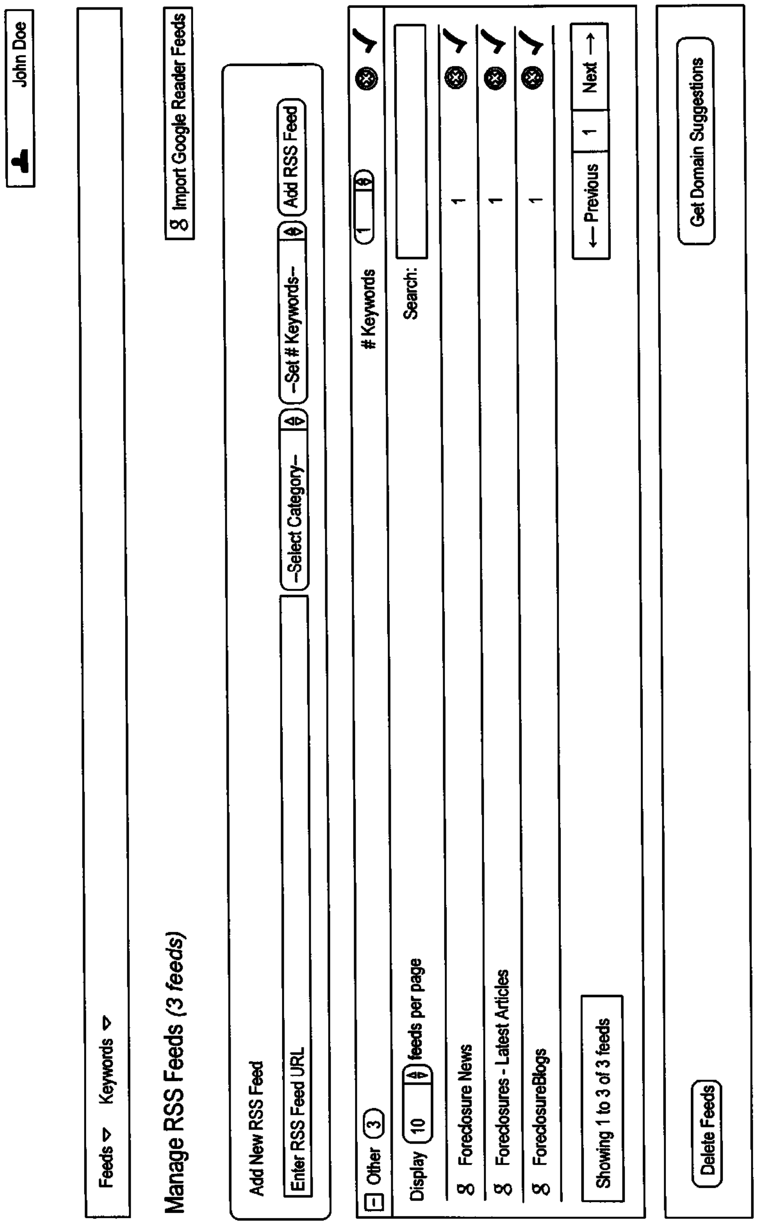

Fig. 5C

Feeds ▽  Keywords ▽                                                                 👤 John Doe Google Reader Feeds *(3 feeds)*

☐ Other (3)                                      # Keywords (1 🗑)            ✏

Display (10 ⬍) feeds per page                  Search: [          ]

⌇ Real Estate News                               1                    ⊗       ✏
⌇ Financial Times                                1                    ⊗       ✏
⌇ Wall Street Journal                            1                    ⊗       ✏

Showing 1 to 3 of 3 feeds                       ← Previous  1  Next →

[ Cancel ]                                                         [ Save Feeds ]

Feeds ▼ Keywords ▼

Custom Keywords *(0 words)*

Enter custom keyword | Add Custom Keyword

Display [10 ▼] feeds per page

⊗ Custom Keywords | Date Added

No feeds found

Showing 0 to 0 of 0 feeds | ← Previous | Next →

Delete Custom Keywords

Search:

John Doe ▼

Feeds ▼    Keywords ▼

🔒 John Doe ▼

Stop Keywords *(0 words)*

Enter stop keywords    [Add Stop Keyword]

Display [10 ◊] feeds per page                                Search: [        ]

⊗  Stop Keywords                                              ↔         Date Added ↔

No feeds found

Showing 0 to 0 of 0 feeds                            [← Previous]  [Next →]

[Delete Stop Keywords]

| Category | Keywords(Frequency) for "Other" | Suggestions for "foreclosure" |
|---|---|---|
| Other | foreclosure(18) ⊘ | MyForeclosure.net |
| | bailout(4) ⊘ | Foreclosuremess.net |
| | | Foreclosure-mess.net |
| | | Shortsale.net |
| | | Foreclosed.net |
| | | Foreclosure2008.net |
| | | ForeclosureCrisis.net |
| | | HowtoBuyForeclosures.net |
| | | LatestForeclosures.net |

Go Back     🔊 View RSS Feed

| Suggestions | Date ▲ | Source | Buy |
|---|---|---|---|
| Name1 | 24.2.2012 | RSS1 | ☑ |
| Name2 | 14.2.2012 | RSS2 | ☐ |
| Name3 | 10.1.2012 | URL1 | ☑ |
| Name4 | 5.11.2011 | twitter1 | ☑ |
| Name5 | 10.10.2011 | twitter2 | ☐ |

[ Logout ]  [ BUY ]

| Feeds | Address | Public | Action |
|---|---|---|---|
| RSS1 | http://rss1.com | ☑ | ☐ |
| RSS2 | http://rss2.com | ☐ | ☐ |
| URL1 | http://URL1.com | ☑ | ☐ |
| twitter1 | http://twitter.com/twitter1 | ☑ | ☐ |
| twitter2 | http://twitter.com/twitter2 | ☐ | ☑ |

[ ADD ]  [ Edit ]  [ Delete ]

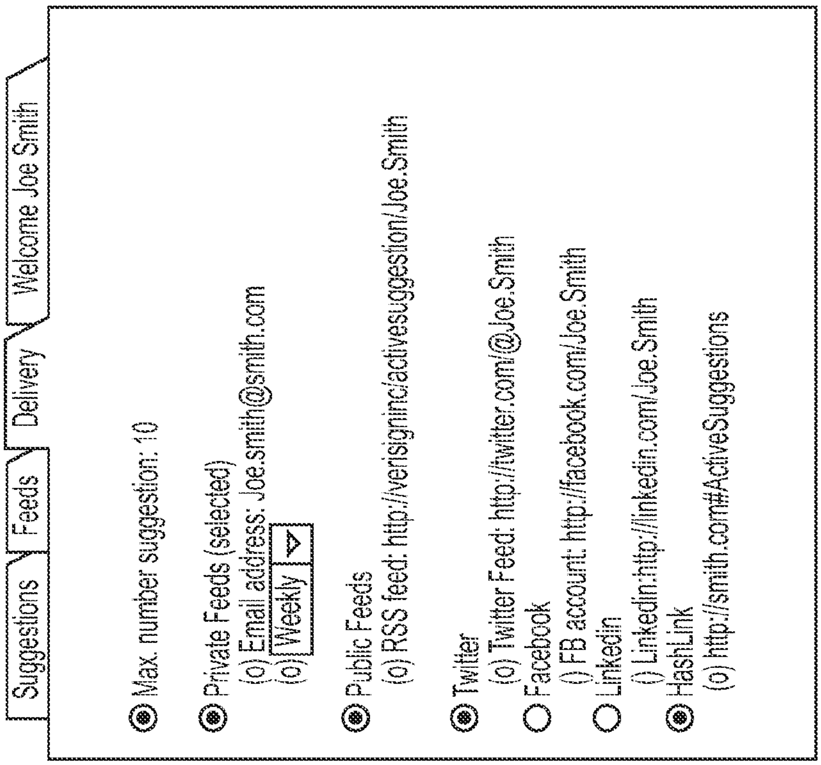

FIG. 6C

| Suggestions | Feeds | Delivery | Welcome Joe Smith |

⦿ Max. number suggestion: 10
⦿ Private Feeds (selected)
    (o) Email address: Joe.smith@smith.com
    (o) [Weekly ▽]
⦿ Public Feeds
    (o) RSS feed: http://verisigninc/activesuggestion/Joe.Smith
⦿ Twitter
    (o) Twitter Feed: http://twitter.com/@Joe.Smith
◯ Facebook
    ( ) FB account http://facebook.com/Joe.Smith
◯ Linkedin
    ( ) Linkedin:http://linkedin.com/Joe.Smith
⦿ HashLink
    (o) http://smith.com/#ActiveSuggestions

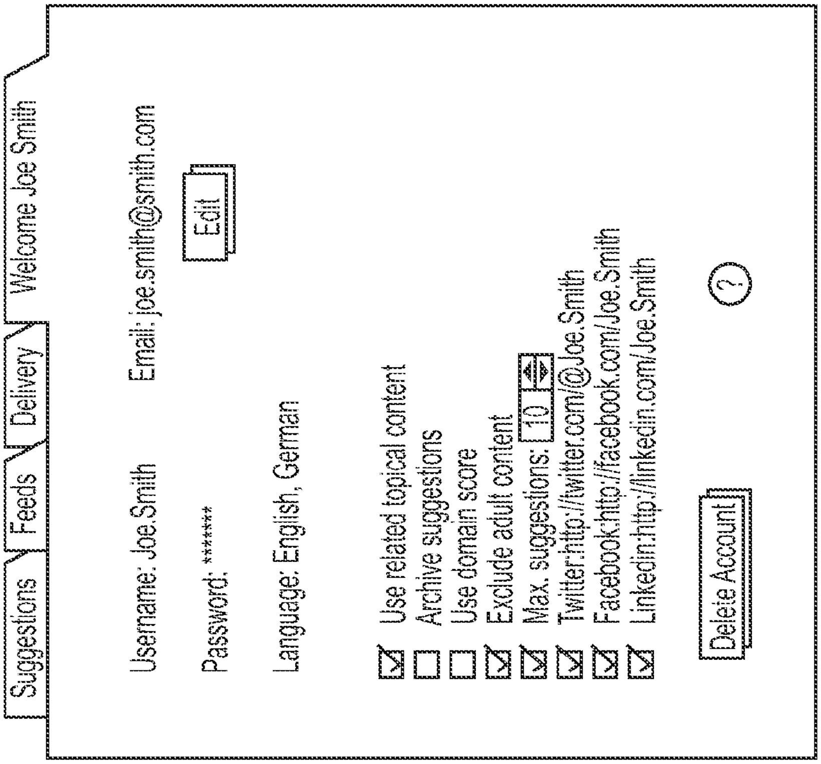

FIG. 6D

| Suggestions | Feeds | Delivery | Welcome Joe Smith |

Username: Joe.Smith     Email: joe.smith@smith.com

Password: *******  [Edit]

Language: English, German

☒ Use related topical content
☐ Archive suggestions
☐ Use domain score
☒ Exclude adult content
☒ Max. suggestions: [10 ⇅]
☒ Twitter:http://twitter.com/@Joe.Smith
☐ Facebook:http://facebook.com/Joe.Smith
☒ Linkedin:http://linkedin.com/Joe.Smith

[Delete Account]    ⓘ

SYSTEMS AND METHODS FOR PROVIDING DOMAIN NAME SUGGESTIONS

TECHNICAL FIELD

The present disclosure relates to providing domain name suggestions, and more particularly, to systems and methods for providing domain name suggestions based on user preferences and terms extracted from one or more information sources.

BACKGROUND OF THE DISCLOSURE

Use of the Internet has grown significantly in recent years. People now access webpages over the Internet for a variety of reasons, such as to shop for items on a company's website or to read an individual's blog. As usage of the Internet has grown, the web presence of businesses and individuals has become more important.

Computers on the Internet identify each other using a numeric identifier known as an Internet Protocol (IP) address. For example, when a request for a webpage is sent from a computer to a web server hosting the webpage, the computer includes the IP address of the web server. However, an IP address consists of a long string of numbers that is difficult for humans to remember.

In order to make the identification of destination computers more user-friendly, a Domain Name System (DNS) has been developed that translates a unique alphanumeric character-based name for a destination computer into the IP address for the computer. This alphanumeric name is called a "domain name." For example, by using domain names, a user can request a webpage on a web server by specifying "verisign-inc.com" rather than the particular IP address of the web server (e.g., 198.41.1.40). Domain Name System ("DNS") is the Internet's hierarchical lookup service for mapping character-based domain names into numerical IP addresses.

Domains exist at various different levels within the DNS hierarchy. For example, a top-level domain (TLD), such as "com" or "net," is a domain at a high level in the DNS hierarchy. A second-level domain (SLD) is a subdomain of a TLD that is directly below the TLD in the DNS hierarchy. For example, "com" is the TLD and "example" is the SLD for the domain name "www.example.com."

Domain names are obtained by registering an available domain name with a domain name registrar. A registrar for a TLD can assist customers in registering new domain names for that TLD (e.g., .com) and can perform the necessary actions so that DNS information for those domain names is stored in a manner accessible to name servers for that TLD. Registrars typically provide a website through which customers can register available domain names for a fee.

A distinctive, easy-to-remember domain name is an important part of a web presence for individuals and businesses. Unfortunately, there are currently a limited number of domain names, and many desirable domain names in the most popular TLDs (e.g., .com) have already been taken. Thus, it is difficult to identify desirable domain names that are available (unregistered), otherwise known as non-existent domains (NXDomains). Current domain name suggestion services accept one or more keywords as a query and list available domain names based on the query. If the customer does not find any of the listed domain names to be acceptable, he must try again with different keywords or at a later time.

Accordingly, an improved approach to identifying and suggesting available and desirable domain names is needed. The disclosed embodiments address one or more of the problems set forth above.

SUMMARY OF THE DISCLOSURE

Consistent with the present disclosure, there is provided a computer-implemented method for providing targeted domain name suggestions, comprising receiving an indication from a user and storing the indication in a user profile associated with the user. The method also comprises identifying at least one suggested domain name by extracting a term from an information source, generating, by one or more processors, one or more domain name suggestions based on the term, and recording the one or more domain name suggestions in at least one memory. The method further comprises providing the one or more domain name suggestions to the user.

Also consistent with the present disclosure, there is provided a computer system for providing targeted domain name suggestions, comprising at least one memory storing instructions and at least one processor that, when executing the instructions, is configured to receive an indication from a user and store the indication in a user profile associated with the user. The processor, when executing the instructions, is also configured to identify at least one suggested domain name by extracting a term from an information source, generating one or more domain name suggestions based on the term, and recording the one or more domain name suggestions. The processor, when executing the instructions, is further configured to provide the one or more domain name suggestions to the user.

Before explaining at least one embodiment of the disclosure in detail, it is to be understood that the disclosure is not limited in its application to the details of construction and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

FIG. 5C illustrates an exemplary user interface screen that allows a customer to manage RSS feeds.

FIG. 6C illustrates an exemplary user interface screen for setting customer preferences regarding delivery mechanisms to use for delivery of domain name suggestions.

FIG. 6D illustrates an exemplary user interface screen for setting additional customer preferences regarding domain name suggestions.

DETAILED DESCRIPTION

Reference will now be made in detail to the present embodiments of the disclosure, certain examples of which are illustrated in the accompanying drawings.

The systems and methods described herein may actively provide domain name suggestions to customers based on customer preferences and/or terms extracted from information sources. The systems and methods may analyze terms from a variety of information sources to identify terms and/or phrases that are popular, such as terms reflecting current events. These terms may be used to generate domain names that include one or more of the popular terms or variations of the popular terms, and the generated domain names may be provided to customers as suggestions for registration. Thus, the systems and methods may be capable of generating domain names that are likely to be of high-value to customers.

The systems and methods described herein may provide domain name suggestions based on user preferences. For example, a customer may subscribe to a domain name suggestion service and provide the service with domain name suggestion preferences, such as a preference for domain names that include terms related to a particular topic. The service may create a user profile for storing the customer's preferences, and store the user profile in a database of user profiles for customers using the service. Based on the stored customer preferences in the user profile, the service may periodically send domain name suggestions to the customer.

The systems and methods described herein may address the problems of current domain name suggestion services by generating high-value domain names based on currently popular terms, and/or by periodically providing suggested domain names to customers based on persistent customer preferences. In addressing these problems, the systems and methods may provide increased customer satisfaction, which may stimulate domain sales and result in higher revenue for domain name registrars.

Figure 1:
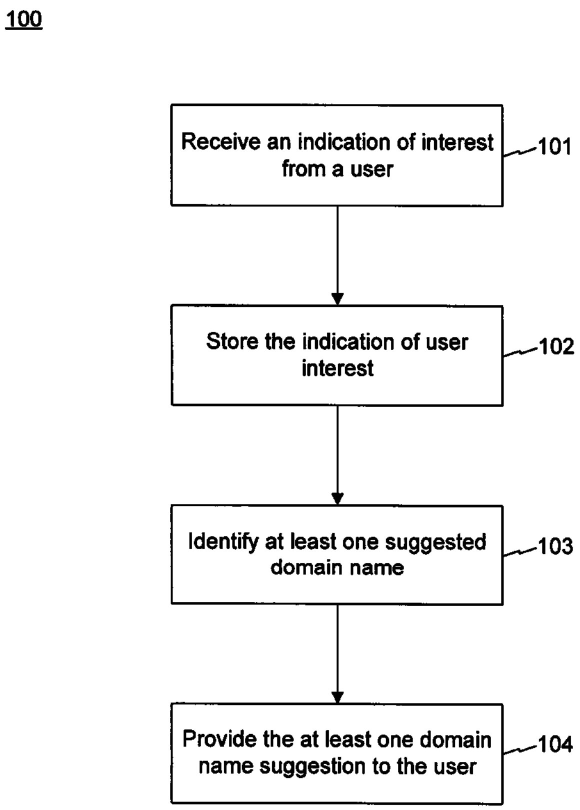
FIG. 1 illustrates an exemplary method for providing domain name suggestions based on user preferences and terms extracted from one or more information sources.

FIG. 1 illustrates an exemplary method 100 for carrying out embodiments disclosed herein. In step 101, at least one indication of customer interest related to domain names may be received from a customer of a domain name suggestion service. For example, the at least one indication of customer interest may indicate an interest in receiving domain name suggestions related to a particular topic. Alternatively or in addition to a topic of interest, the at least one indication of customer interest may indicate one or more information sources from which to extract terms used in generating domain name suggestions. The indicated one or more information sources may include public, private, general, and/or personalized information sources. For example, the customer may indicate that he wants the service to extract terms from his or another person's Twitter messages or from an RSS feed. Alternatively, the user may be a sports enthusiast and may indicate that he wants the service to extract terms from a particular public sports website. The indication of customer interest may also indicate one or more information sources that the customer wants "muted," or not used in generating domain name suggestions.

In step 102, the at least one indication of customer interest may be stored in a user profile associated with the customer. The user profile may store a variety of customer preferences. As noted above, the user profile may store one or more topics of interest and/or one or more information sources to use in generating suggested domain names. The user profile may also store one or more of the customer's preferred mechanisms for receiving domain name suggestions, and/or a frequency with which the customer wishes to receive domain name suggestions.

In step 103, the domain name service may identify at least one suggested domain name. In step 104, the service may provide the at least one suggested domain name to the customer. For example, if the customer has indicated a preferred delivery mechanism and a preferred frequency at which to receive domain name suggestions, the service may provide identified domain name suggestions to the customer over the preferred delivery mechanism at the preferred frequency (e.g., via electronic mail once a week).

Figure 2:
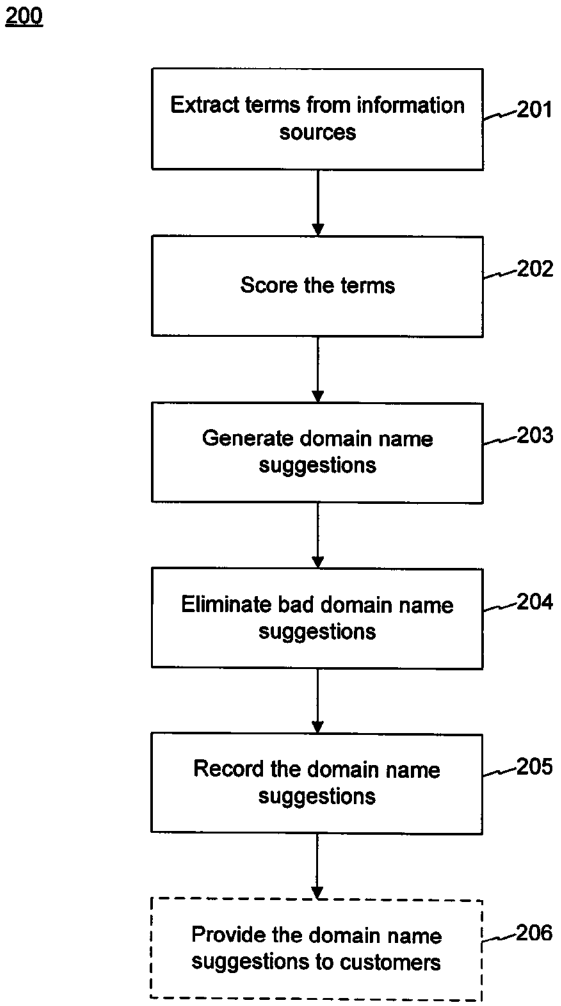
FIG. 2 illustrates an exemplary method for providing domain name suggestions based on terms extracted from one or more information sources.

FIG. 2 illustrates an exemplary method 200 that may identify suggested domain names. For example, step 103 of method 100 may utilize method 200 to identify domain name suggestions. In step 201, one or more terms may be extracted from one or more information sources. As previously noted, the information sources may be a variety of sources, and may include public, private, general, and/or personalized information sources. The method may utilize data stream parsing, web crawling, and/or screen scraping techniques to obtain text from the information sources. The method may then parse the text into terms. The terms may be sets of alphanumeric characters, words, and/or clusters of words found together in combination. The method may extract all of the terms in an information source or only terms that occur in the information source with a particular frequency. As an example, suppose terms are extracted from four information sources with information about a financial crisis. The term "bailout" may be extracted from source A, the term "subprime" may be extracted from both sources B and C, and the terms "financial crisis" and "foreclosure" may be extracted from source D.

Extracted terms may be associated with category or topic identifiers. This may be accomplished by determining a category or topic of information provided by an information source and by associating identifiers corresponding to that category or topic with terms extracted from that information source. For example, if a term is extracted from an information source that is known to provide "sports" content, an identifier indicating "sports" may be associated with the term.

In step 202, the terms may be scored to identify popular terms, such as terms indicative of current events and/or terms that match user preferences. In certain embodiments, the terms may be scored based, at least in part, on a source from which the terms were extracted. For example, terms may be scored higher if extracted from a popular information source, such as an information source that is a favorite source among customers. Terms may also be scored higher if extracted from an information source that has a high registration conversion rate. For example, the domain name service may identify a high rate of past registration of domain names generated from terms extracted from the information source. This may indicate that the information source is a good source of terms, and the service may score terms extracted from this information source higher to reflect this phenomenon. Terms may also be scored higher based on frequency of appearance of the terms within information sources or across multiple information sources. Additionally, a term that appears frequently in one or more information sources, but that did not appear frequently in the past, may indicate an early trend in the use of the term. This may indicate that it would be a good term for generating domain names that are likely still available for registration. Accordingly, the term may be scored highly. Terms extracted from an information source's content may also be scored based on "freshness" of the content, that is, on how new the content is. For example, terms extracted from an article that was published one day ago may be scored higher than terms extracted from an article that was published one week ago.

A term may also be scored based on preferences stored in one or more customer profiles. For example, a customer's profile may indicate that he does not want domain name suggestions generated based on the term "bailout." Accordingly, the term "bailout" may receive a low score or be excluded entirely from use in generating domain name suggestions for the customer. As another example, a customer's profile may indicate that the customer prefers domain names relating to sports. Based on this information, an input term extracted from an information source known to provide sports content may be scored higher.

In step 203, the scored terms may be input into a domain name generation service to generate available domain names for suggestion to customers. In one embodiment, all of the scored terms may be input into a domain name generator. In an alternative embodiment, only terms that score above a certain threshold may be input into the domain name generator. The domain name generator may generate one or more domain names based on each term input to the domain name generator. For example, the domain name generator may generate domain names that include the term, a synonym of the term, a related term, or a term that relates to a topic associated with the term. The domain name generator may also combine terms and/or add prefixes, suffixes, hyphens, and/or numbers to terms. For example, if an input term is "foreclosure," the generated names may include "myforeclosure," "foreclosuremess," "foreclosure-mess," "shortsale," "foreclosed," or "foreclosure2008." The generated names may then be checked for availability among a variety of TLDs (e.g., .com, .net, .tv, .cc). If the generated domain name is not available, it is not passed on to step 204 of method 200.

In step 204, the generated domain name suggestions that are available for registration may be analyzed and "bad" domain name suggestions may be eliminated. For example, a generated domain name may have been previously presented to this and/or other customers for registration. Previous presentation of a domain name to customers may indicate that the domain name is not very desirable, particularly if the domain name has been suggested for a long period of time without being registered. Accordingly, generated domain names that have already been suggested for a certain period of time may be expired and not passed on to step 205 of method 200. This may also prevent customers from having to keep reviewing domain name suggestions that they have already decided they're not interested in registering.

Bad domain name results may also be determined by comparing the generated domain names with lists of domain names known to have been associated with botnets. Use of these domain names may result in compromised computers accessing the web server associated with the domain name even if they are not interested in the content hosted on the web server. Accordingly, generated domain names that are listed on a botnet list may be eliminated and not passed on to step 205 of method 200.

In step 205, the generated domain name suggestions passed from step 204 may be recorded in at least one memory in preparation for presentation to one or more customers.

As previously noted, step 103 of FIG. 1 may utilize method 200 to generate domain name suggestions for a particular customer. This may represent a first embodiment, in which, rather than proceeding to step 206, method 100 may proceed to step 104 after one or more generated domain name suggestions for the particular customer have been recorded in step 205. In step 104, the one or more generated domain name suggestions may be provided to the customer.

In a second embodiment, method 200 may operate independently of method 100, and may generate domain name suggestions for the general public. In this embodiment, the domain name suggestions recorded in step 205 may be provided to the customers in step 206.

Regardless of whether a system or method implements the first or second embodiment, method 200 may be continuously or periodically performed. Thus, a domain name service may continuously or periodically extract terms from a variety of information sources and may continuously or periodically generate domain name suggestions based on the extracted terms. Thus, the domain name service may continuously or periodically update domain name suggestions based on trends and current events.

If a system and method implements the second embodiment, the continuously or periodically identified domain name suggestions may be continuously or periodically provided to the customers. For example, one or more lists of suggested domain names may be provided on a web site, and the one or more lists may be continuously or periodically updated based on changes in trends, current events, input terms, and/or domain name availability. The one or more lists may be categorized on the webpage, so that customers can sort domain name suggestions by category on the web site.

Alternatively, a domain name service may utilize both the first and second embodiments. For example, some customers may choose to receive personalized domain name suggestions, while other customers may choose to view general domain name suggestions. The first and second embodiments may also be offered as different customer subscription options. For example, customers wishing to receive personalized domain name suggestions, such as those provided by method 100, may need to subscribe by paying a fee, while general domain name suggestions may be provided to customers for free via a publicly accessible web site. Fee-based subscription may provide certain other benefits to paying subscribers. For example, domain name suggestions for a particular fee-based customer may be presented first to only the fee-based customer. If the fee-based customer chooses not to register a suggested domain name, it may then expire and be presented to the public as a general domain name suggestion.

Figure 3:
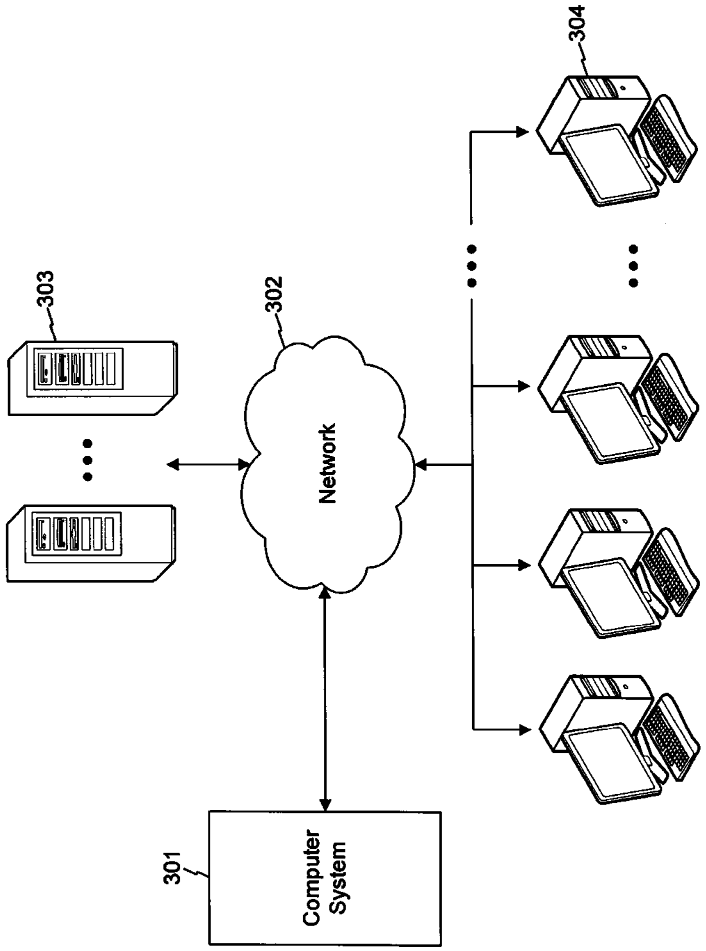
FIG. 3 illustrates an exemplary system for implementing the disclosed embodiments.

FIG. 3 illustrates a diagram of an exemplary system 300 that may provide a domain name suggestion service in accordance with the embodiments disclosed herein. A computer system 301 may extract terms from a variety of information sources 303, and may actively provide domain name suggestions to customers based on customer preferences and/or terms extracted from information sources 303. Customers may use client devices 304 to communicate their domain name preferences to computer system 301 over network 302. Computer system 301 may include one or more computers, which may be servers, personal computers, and/or other types of computing devices. Information sources 303 may also include one or more computers, which may be servers, web servers, personal computers, and/or other types of computing devices.

Client devices 304 may include a variety of different types of computing devices capable of communicating with computer system 301 over network 302. These computing devices may include personal computers, laptops, personal digital assistants (PDA), telephones, mobile phones, smartphones, tablet computers, servers, and/or other types of computing devices. A customer may use more than one type of client device to communicate with computer system 301.

Information sources 303 may include a wide variety of different information sources, including public, private, general, and/or personalized information sources. Information sources 303 may include sources of information that are accessible electronically over network 302. Information sources 303 may also include social networking or social aggregation sources, such as Facebook and Linkedin. Information sources 303 may include domain tag cloud, non-existent domain (NXD), registered domain name, Twitter, Bitly, Facebook, Flickr, Yahoo!, RSS, BuzzFeed, Reddit, Digg, Delicious, Pinboard, email, text message, user input, news, web page, blog, and/or foreign language content. For example, the domain name suggestion service may extract terms from recently registered domain names in a domain tag cloud in order to identify terms that frequently occur in recent domain registrations. As another example, the domain name suggestion service may extract terms from NXD sources to identify terms that frequently occur in requests for domain names that are not currently registered.

Network 302 may include one or more types of networks interconnecting computer system 301 with information sources 303 and client devices 304. For example, one of client devices 304 may communicate with computer system 301 over a coaxial cable network, while a different one of client devices 304 may communicate with computer system 301 over a cellular network. Network 302 may include one or more wide area networks (WANs), metropolitan area networks (MANs), local area networks (LANs), or any combination of these networks. Network 302 may include a combination of a variety of different network types, including Internet, Ethernet, twisted-pair, coaxial cable, fiber optic, cellular, satellite, IEEE 802.11, terrestrial, and/or other types of network connections.

Figure 4:
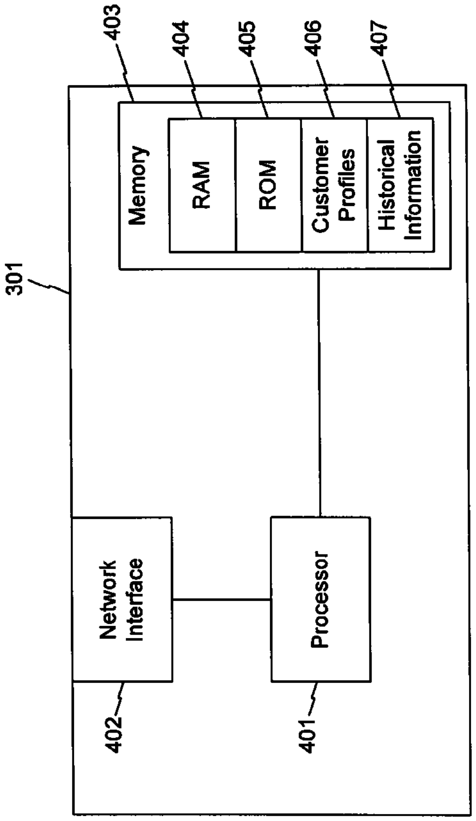
FIG. 4 illustrates an exemplary computer system for implementing the disclosed embodiments.

FIG. 4 is a diagram illustrating an exemplary computer system 301 that may be used for implementing the disclosed embodiments. Computer system 301 may include one or more computers, which may be servers, personal computers, and/or other types of computing devices. Computer system 301 may include a processor 401 that may be any suitable type of processor. Processor 401 may be coupled to a network interface 402 for receiving and/or transmitting data and/or commands to/from other devices over a variety of networks, such as Internet, Ethernet, twisted-pair, coaxial cable, fiber optic, cellular, satellite, IEEE 802.11, terrestrial, or other wired or wireless networks.

Processor 401 may also be coupled to memory 403. Memory 403 may be configured to store instructions that, when executed by processor 401, carry out the disclosed methods. Memory 403 may also store an operating system, applications, and/or parameters. Data stored on memory 403 may be stored in a single dedicated memory, or over a plurality of memory devices. Memory 403 may include any type of memory: physical, non-transient, volatile, or non-volatile, including, but not limited to, random access memory (RAM), read-only memory (ROM), magnetic strip storage, semiconductor storage, optical disc storage, and/or magneto-optical disc storage.

Memory 403 may also include one or more databases for storing customer profiles 406. A customer of the domain name suggestion service may provide computer system 301 with one or more indications of interest related to domain names. For example, an indication of interest may indicate an interest in receiving domain name suggestions related to a particular topic. Alternatively or in addition to a topic of interest, the one or more indications of interest may indicate one or more information sources from which to extract terms used in generating domain name suggestions for the customer. For example, a customer may indicate that he wants the domain name suggestion service to extract terms from Twitter messages or from an RSS feed.

Indications of customer interest may be stored in a user profile associated with the customer. The user profile may store a variety of customer preferences. As noted above, the user profile may store one or more topics of interest and/or one or more information sources to use in generating domain name suggestions. The user profile may also store one or more information sources that the user does not wish to be used in generating domain name suggestions. The user profile may also store one or more of the customer's preferred mechanisms for receiving domain name suggestions, and/or a frequency with which the customer wishes to receive domain name suggestions. For example, a customer's profile may indicate that the customer wants to receive domain name suggestions weekly by email and daily by an RSS feed. Customers may specify a variety of delivery mechanisms for receiving domain name suggestions. The delivery mechanisms may include, for example, a web page, email, an RSS feed, Twitter, Facebook, and/or text messages. A customer's profile may also store a variety of other preferences for the customer. For example, a customer may specify that domain name suggestions should be filtered based on characteristics, such as character length or character pattern, before being delivered to the customer.

Customer profiles may be available to all customers of the domain name suggestion service, or a group of those customers. For example, the service may restrict the use of customer profiles to customers who are fee-paying subscribers of the domain name suggestion service.

Memory 403 may also include one or more databases for storing historical information 407 of the domain name suggestion service. This historical information database may store information regarding domain name suggestions that have been made by the domain name service over time. Historical information database 407 may be constantly updated with new information as new domain name suggestions are made. The information in the historical information database 407 may be utilized by the domain name suggestion service as feedback information that improves the algorithms of the domain name suggestion service over time. For example, the domain name suggestion service may use machine-learning algorithms that are self-learning and that improve the domain name suggestion algorithms based on the historical information in order to provide better domain name suggestions.

Information in historical information database 407 may include information about which domain names were previously suggested, the number of domain name registrations that have resulted from terms extracted from particular information sources, and/or a conversion rate of the number of domain name suggestions based on terms from an information source to the number of those domain name suggestions that have been registered. The historical information may also store information about which terms appear most frequently in a particular information source and which terms appear most frequently over multiple sources. The historical information may also store information about the number of domain name registrations based on a particular term or category of term within a particular source or across multiple sources. The historical information may additionally store information about whether a particular customer registers domain names that include a particular term, or whether similar customers register domains names that include a particular term.

The machine-learning algorithms may analyze the historical information to improve the algorithms of the domain name suggestion service. For example, the machine-learning algorithms may analyze domain name suggestions that are not registered and score the information sources providing the terms for those suggestions lower in the future. The machine-learning algorithms may also track which categories of terms provide results that are registered, and which categories of terms do not, and may adjust scores for terms falling into those categories accordingly.

As noted previously, processor 401 may associate scores with terms extracted from information sources based on one or more factors. For example, terms that occur frequently within an information source or across a plurality of information sources may indicate that the terms are more popular than terms occurring less frequently. Accordingly, these terms may be assigned higher scores than terms that appear less frequently. Processor 401 may also analyze information in historical information database 407 in assigning scores. For example, information in the historical information database 407 may indicate that a particular customer, or a customer with similar preferences, regularly registers domain names containing a particular term. Based on this information, processor 401 may score this term or terms related to this term higher than other terms. Historical information database 407 may also store information on how frequently terms appear in media outside of the domain name suggestion service. Terms may also be assigned higher or lower scores based on preferences stored in a customer's profile. For example, if a customer's profile indicates that the customer wants a particular term to be included in generating domain name suggestions, that term may be assigned a higher score when extracted from an information source. Terms extracted from an information source's content may also be scored based on "freshness" of the content.

After generating a suggested domain name based on an input term, processor 401 may assign the score associated with the term to the suggested domain name. The suggested domain names may then be sorted to prioritize the domain names with higher scores. For example, when providing a list of suggested domain names to a customer, the processor may order the domain names in the list from those receiving the highest scores to those receiving the lowest scores. If a customer's preferences indicate that the customer wishes only to receive ten domain names, for example, the suggested domain names with the ten highest scores may be provided. Processor 401 may also generate more domain names for terms with higher scores.

As an example, suppose that the terms extracted from the information sources include the terms "foreclosure" and "bailout." Based on an analysis of one or more of the above-described factors, processor 401 may assign the term "foreclosure" a score of 75, and the term "bailout" a score of 50. Suggested domain names may then be generated based on these terms. In providing the domain name suggestions to a customer, domain names generated based on the term "foreclosure" may appear higher towards the top of the list of domain name suggestions than domain names generated based on the term "bailout." Alternatively or additionally, the list of domain name suggestions provided to the customer may include approximately three suggestions based on the term "foreclosure" for every two suggestions based on the term "bailout."

Figure 5A:
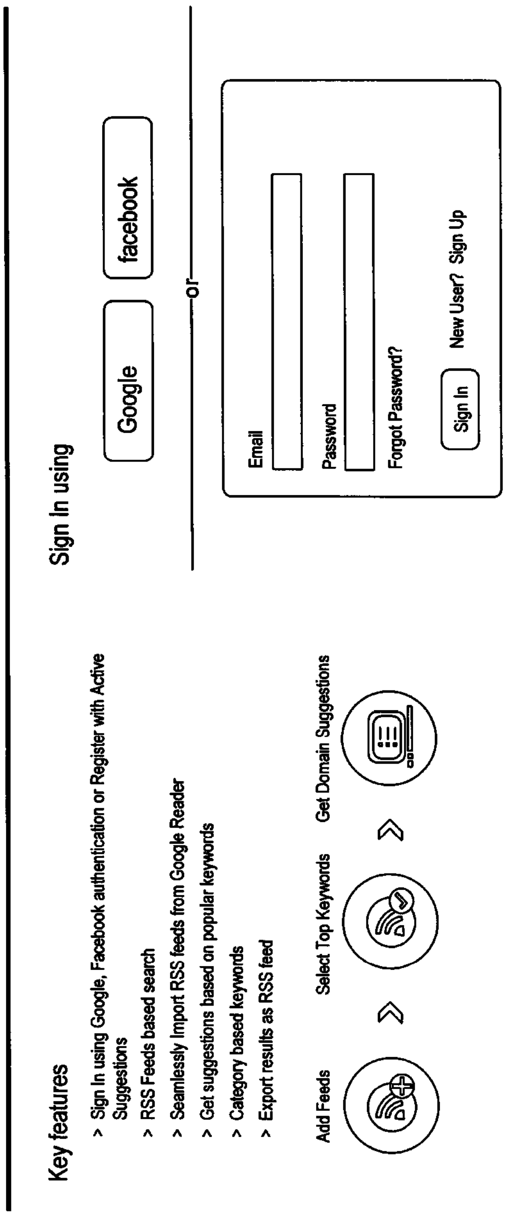
FIG. 5A illustrates an exemplary user interface screen including information about features of a domain name suggestion service and a login section.

FIGS. 5A-5H illustrate exemplary user interface screens that may be presented to customers subscribing to the domain name suggestion service. User interface screens may be provided on a web site of the domain name generation service, and may be rendered on a customer's client device using a web browser, for example. FIG. 5A illustrates an exemplary user interface screen for signing into a domain name generation service. The user interface screen of FIG. 5A may include information about features of the service, and a login section. The login section may provide selectable options for registering as a new customer of the service or logging in as an existing customer of the service. Existing customers may login using, for example, an e-mail address and password. The login section may also provide an option to sign in using login information from an existing Google or Facebook account.

Figure 5B:
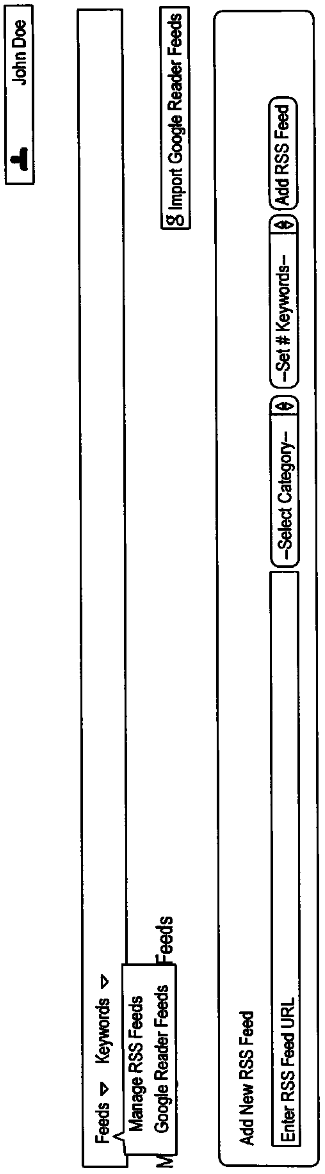
FIG. 5B illustrates an exemplary user interface screen that allows a customer to manage information sources.

FIG. 5B illustrates an exemplary user interface screen that allows a customer of the domain name generation service to manage his information sources. Using the user interface screen of FIG. 5B, the customer may add information sources from which to extract the terms used in generating the domain name suggestions. For example, the user interface screen of FIG. 5B illustrates a selectable prompt that allows a customer to manage RSS feeds or Google Reader feeds. When adding a new RSS feed, a user may, for example, enter the URL of the RSS feed, select a category of information provided by the RSS feed, and/or set a number of keywords to use in generating domain name suggestions. The exemplary user interface of FIG. 5B also illustrates a selectable option for importing a customer's Google Reader feeds.

FIG. 5C illustrates another exemplary user interface screen that allows a customer of the domain name generation service to manage his information sources. The user interface screen of FIG. 5C may display, for example, a customer's RSS feeds and allow the customer to add, edit, or delete RSS feeds.

Figure 5D:
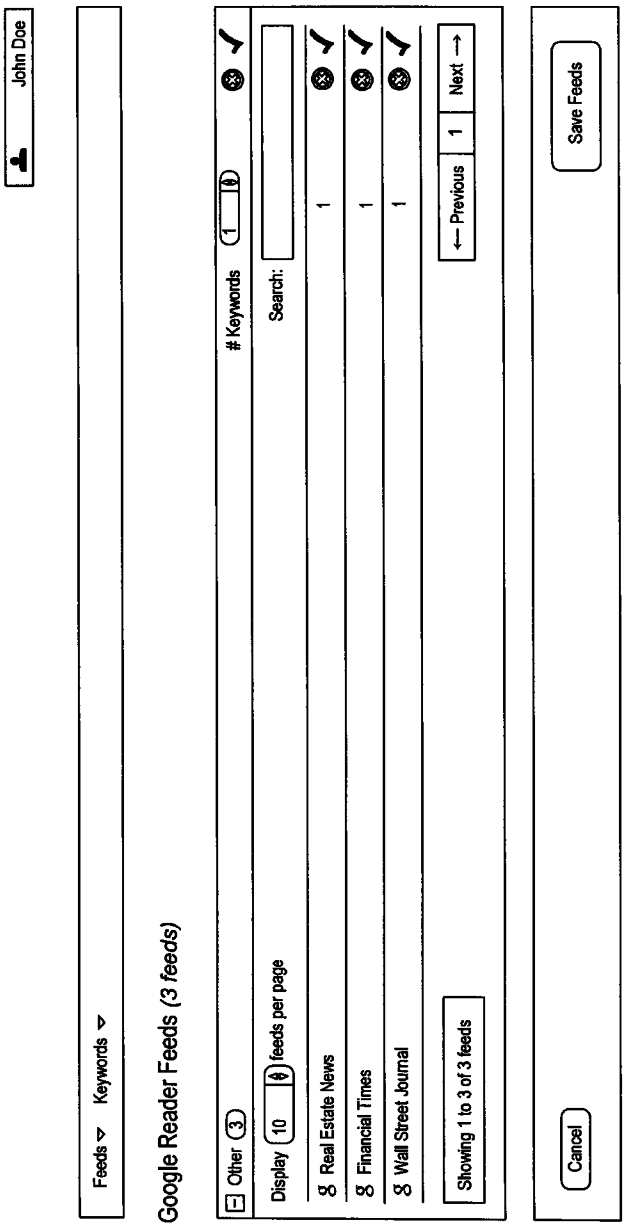
FIG. 5D illustrates an exemplary user interface screen that allows a customer to manage Google Reader feeds.

FIG. 5D illustrates another exemplary user interface screen that allows a customer of the domain name generation service to manage his information sources. The user interface screen of FIG. 5D may display, for example, a customer's Google Reader feeds and allow the customer to add, edit, or delete Google Reader feeds.

Figure 5E:
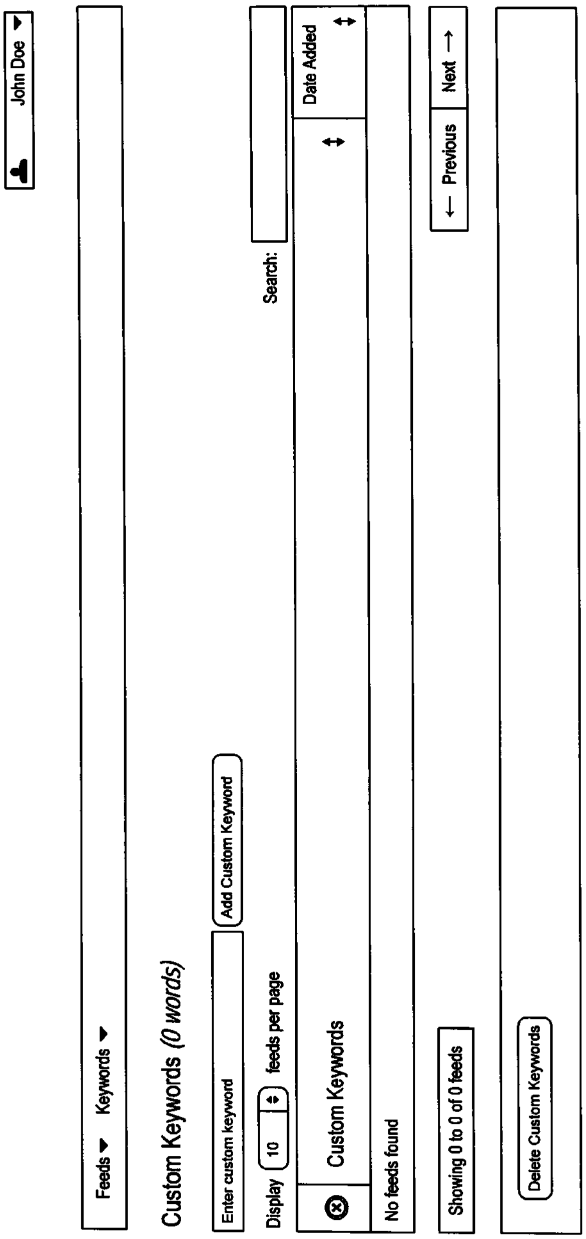
FIG. 5E illustrates an exemplary user interface screen that allows a customer to add or delete custom keywords.

FIG. 5E illustrates an exemplary user interface screen that allows a customer to add or delete custom keywords. Custom keywords may be terms that a customer has a preference for utilizing in generating domain name suggestions.

Figure 5F:
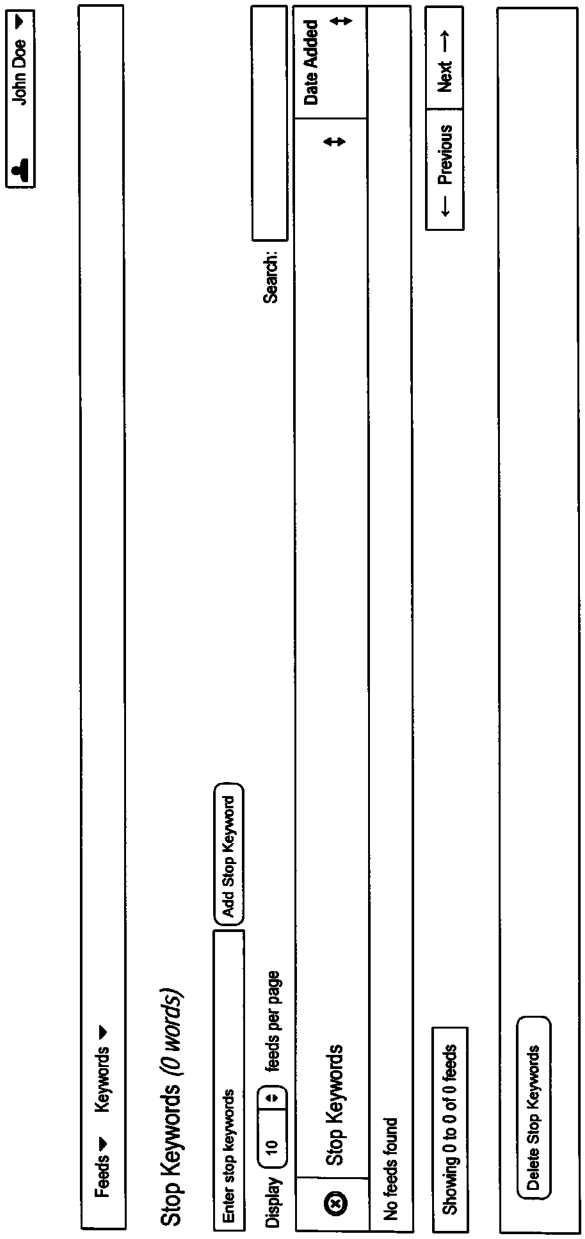
FIG. 5F illustrates an exemplary user interface screen that allows a customer to add or delete "stop" keywords.

FIG. 5F illustrates an exemplary user interface screen that allows a customer to add or delete "stop" keywords. "Stop" keywords may be terms that a customer does not want to be used in generating domain name suggestions.

Figure 5G:
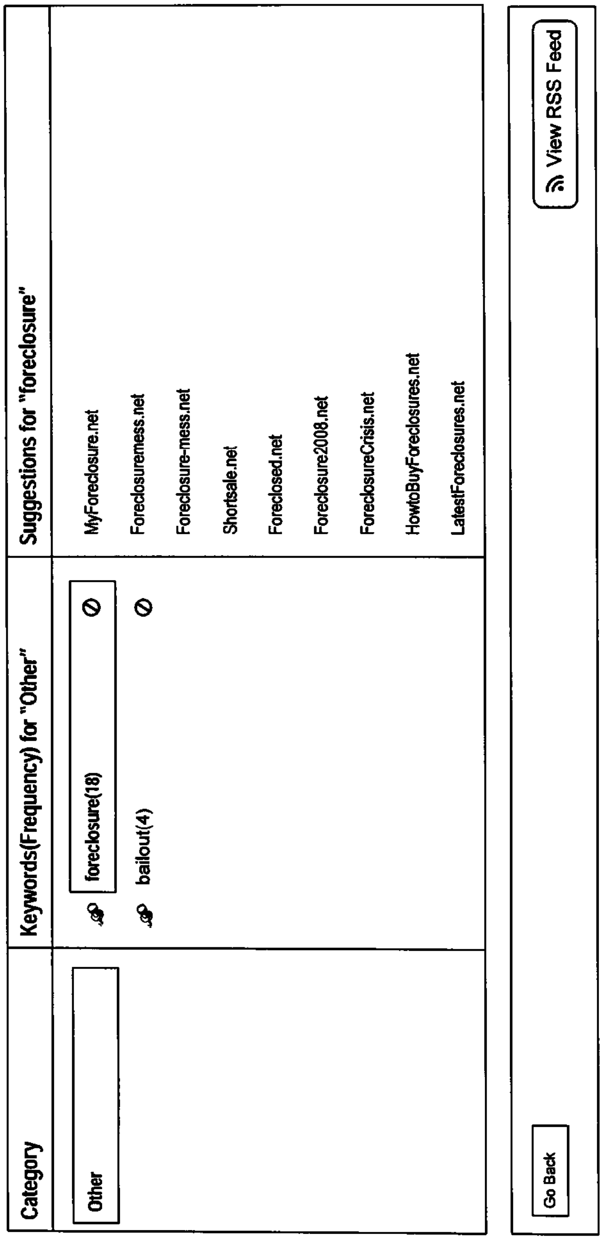
FIG. 5G illustrates an exemplary user interface screen that displays domain name suggestions based on category and/or keywords.

FIG. 5G illustrates an exemplary user interface screen that displays domain name suggestions based on category and/or keyword. For example, in the exemplary user interface screen of FIG. 5G, a category "other" is selected, and keywords "foreclosure" and "bailout" are displayed. The user interface screen displays, for example, a frequency with which each keyword appeared in the information sources. For example, the user interface screen of FIG. 5G illustrates that the keyword "foreclosure" appeared eighteen times in the information sources, while the keyword "bailout" appeared four times in the information sources. The list of keywords in the user interface may be sorted by frequency, so that keywords with the most appearances in the information sources appear toward the top of the list. Upon selection of a keyword, a list of domain name suggestions generated based on the keyword may be displayed. For example, in the exemplary user interface screen of FIG. 5G, the keyword "foreclosure" is selected, and domain name suggestions that were generated based on the keyword "foreclosure" are displayed. The exemplary user interface screen of FIG. 5G may also provide a user with the option to view an RSS feed including the domain name suggestions. Although not shown in FIG. 5G, a user interface screen listing generated domain name suggestions may also display counts and names of recent registrations by other customers, in order to create an urge in the customer to register a domain name before others do.

Figure 5H:
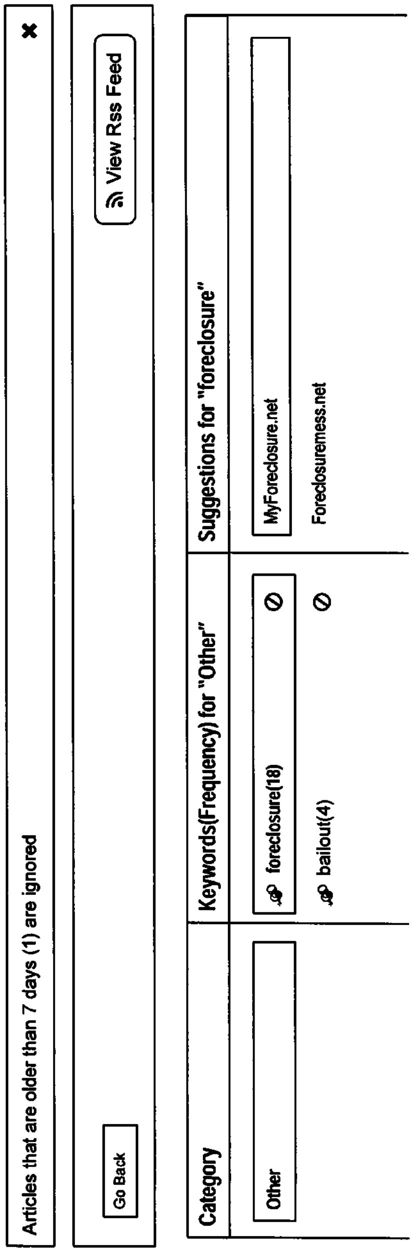
FIG. 5H illustrates an exemplary user interface screen that removes domain name suggestions generated based on articles that are old or expired.

FIG. 5H illustrates an exemplary user interface screen that removes domain name suggestions that are generated based on information source content that is old or expired. For example, in the exemplary user interface screen of FIG. 5H, domain name suggestions that were generated based on articles that are older than seven days are ignored, as indicated by the text at the top of the screen. In this example, there is one article older than seven days that has been ignored.

Figure 6B:
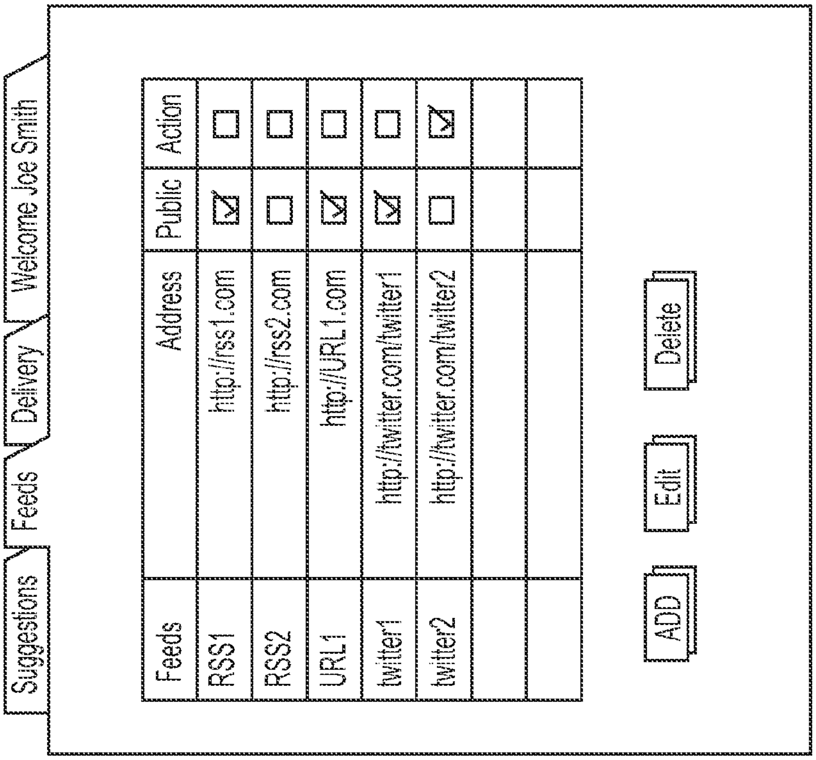
FIG. 6B illustrates an exemplary user interface screen for setting customer preferences for information sources to use in extracting terms.
Figure 6A:
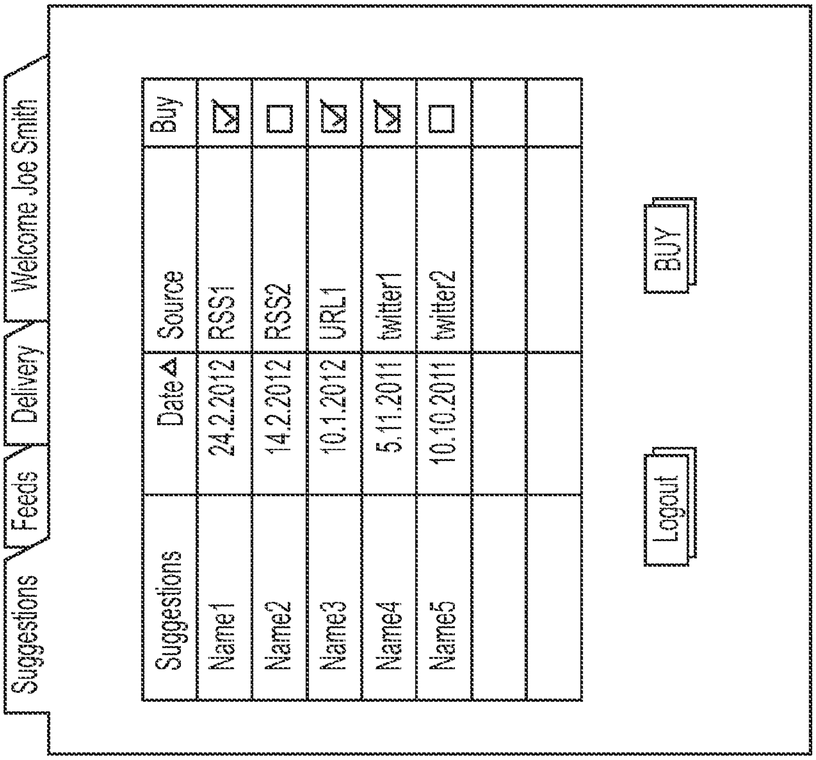
FIG. 6A illustrates an exemplary user interface screen providing a list of domain name suggestions.

FIGS. 6A-6D illustrate additional exemplary user interface screens that may be presented to customers in addition to or as alternatives to the exemplary user interface screens of FIGS. 5A-5H. The user interface screens may be provided on a web site of the domain name generation service, and may be rendered on a customer's client device using a web browser, for example. FIG. 6A illustrates an exemplary user interface screen including a list of domain name suggestions that may be provided to a customer. The user interface screen of FIG. 6A may include a list of domain name suggestions, the dates on which each of the domain names were suggested, and the information sources that provided the terms used in generating each of the domain name suggestions. The user interface screen of FIG. 6A may also include one or more user selection boxes that may be selected by a customer wishing to register one or more of the suggested domain names. Although not shown in FIG. 6A, a user interface screen listing generated domain name suggestions may also display counts and names of recent registrations by other customers, in order to create an urge in the customer to register a domain name before others do.

FIG. 6B illustrates an exemplary user interface screen displaying the feeds that may be used to obtain terms for generating domain name suggestions for a customer. Using the user interface screen of FIG. 6B, the customer may add, delete, or edit the information sources from which to extract the terms used in generating the domain name suggestions.

FIG. 6C illustrates an exemplary user interface screen that may display the domain name suggestion delivery preferences of a customer. In this particular example, the customer has limited the maximum number of suggestions delivered to ten. The customer has selected that private feeds of domain name suggestions targeted for the particular customer be delivered weekly to the customer's email address. The customer has also selected that public feeds of domain name suggestions be provided via an RSS feed. The customer has also indicated that he would like domain name suggestions to be provided via a Twitter feed associated with his Twitter account.

FIG. 6D illustrates an exemplary user interface screen displaying further preferences of the customer. The user interface of FIG. 5D may allow the user to set preferences, such as languages in which to provide domain name suggestions, whether to use related topical content in generating domain name suggestions, whether to archive domain name suggestions, whether to use domain scores in ordering the list of domain name suggestions, whether to exclude adult content information sources, a number of maximum domain name suggestions to provide, private and/or public information sources to be used in generating the suggested domain names, and other user account information, such as email addresses, user names, and/or passwords.

User interface screens, such as those illustrated in FIGS. 5A-5H and FIGS. 6A-6D, may allow customers to change their domain name suggestion preferences. By editing, adding, and/or deleting customer preference information in user interface screens, such as those illustrated in FIGS. 5A-5H and FIGS. 6A-6D, a customer may change the customer preference information stored in his user profile.

The many features and advantages of the disclosure are apparent from the detailed specification, and thus, it is intended that the appended claims cover all systems and methods that fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for providing targeted domain name suggestions, comprising:

receiving an indication from a user;

storing the indication in a user profile associated with the user;

identifying at least one suggested domain name by:

extracting a term from an information source, wherein the information source includes at least one of a domain tag cloud, a non-existent domain (NXD) data source, a social aggregator source, a text message source, a news source, a personalized source, a website, or an RSS feed source;

generating, by one or more processors, one or more domain name suggestions based on the term; and recording the one or more domain name suggestions in at least one memory; and providing the one or more domain name suggestions to the user, wherein:

the user profile includes:

one or more topics of interest, and one or more information sources to use in the generating one or more domain name suggestions;

the information source is one of the one or more information sources included in the user profile;

the extracting the term comprises:

parsing the term from the information source based on a frequency of the term in the information source;

associating the term with one or more topics;

the method further comprises:

comparing the one or more domain name suggestions with a list of domain names associated with botnets;

periodically sending the user the one or more domain name suggestions based on stored user preferences, wherein the one or more domain name suggestions are provided to the user based on the one or more topics of interest in the stored user preferences and the one or more topics associated with the term.

2. The method of claim 1, further comprising:

retrieving a preferred delivery mechanism of the user from the user profile; and providing the one or more domain name suggestions to the user via the preferred delivery mechanism.

3. The method of claim 2, wherein the preferred delivery mechanism includes at least one of an RSS feed, a web page, an electronic mail message, a Twitter message, or a text message.

4. The method of claim 1, wherein the indication indicates the information source.

5. The method of claim 1, wherein:

the indication indicates a topic of interest; and the method further comprises:

categorizing the generated one or more domain name suggestions based on a category of information provided by the information source; and providing the one or more domain name suggestions to the user based on a determination that the categorized one or more domain name suggestions correspond to the topic of interest.

6. The method of claim 1, further comprising:

scoring the term based on at least one of a number of registered domain names generated based on terms from the information source, a popularity of the term among users, a frequency with which the term appears in the information source, or a frequency with which the term appears among a plurality of information sources; and providing the one or more domain name suggestions to the user in a list of domain name suggestions, the list of domain name suggestions being sorted to prioritize domain name suggestions based on the scores.

7. The method of claim 1, further comprising determining that a suggested domain name should not be provided to the user based on at least one of:

the suggested domain name appearing on the list of known botnet domains domain names associated with botnets, or the suggested domain name having been previously suggested for a certain period of time without being registered.

8. The method of claim 1, wherein the step of identifying one or more suggested domain names is repeatedly performed.

9. The method of claim 8, wherein the step of identifying one or more suggested domain names is repeatedly performed to identify trends in usage of terms.

10. The method of claim 9, wherein the step of providing the one or more domain name suggestions is periodically performed to update the user with suggested domain names based on trends in the use of terms.

11. The method of claim 9, further comprising:

storing feedback information for improving identification of domain names that are likely to be registered, the feedback information comprising at least one of a number of registered domain names based on terms from different information sources, a number of registered domain names based on categories of terms, a frequency with which the term appears in one or more information sources, or a conversion rate of domain name suggestions to domain name registrations for one or more users; and inputting the feedback information into a machine-learning algorithm to improve the identification of suggested domain names.

12. A computer system for providing targeted domain name suggestions, comprising:

at least one memory storing instructions; and at least one processor that, when executing the instructions, is configured to:

receive an indication from a user;

store the indication in a user profile associated with the user;

identify at least one suggested domain name by:

extracting a term from an information source, wherein the information source includes at least one of a domain tag cloud, a non-existent domain (NXD) data source, a social aggregator source, a text message source, a news source, a personalized source, a website, or an RSS feed source;

generating one or more domain name suggestions based on the term; and recording the one or more domain name suggestions; and provide the one or more domain name suggestions to the user, wherein:

the user profile includes:

one or more topics of interest, and one or more information sources to use in the generating one or more domain name suggestions;

the information source is one of the one or more information sources included in the user profile;

the extracting the term comprises:

parsing the term from the information source based on a frequency of the term in the information source;

associating the term with one or more topics;

the method further comprises:

comparing the one or more domain name suggestions with a list of domain names associated with botnets;

periodically sending the user the one or more domain name suggestions based on stored user preferences, wherein the the domain name suggestions are provided to the user based on the one or more topics of interest in the stored user preferences and the one or more topics associated with the term.

13. The system of claim 12, wherein the at least one processor is further configured to:

retrieve a preferred delivery mechanism of the user from the user profile; and provide the one or more domain name suggestions to the user via the preferred delivery mechanism.

14. The system of claim 13, wherein the preferred delivery mechanism includes at least one of an RSS feed, a web page, an electronic mail message, a Twitter message, or a text message.

15. The system of claim 12, wherein the indication indicates the information source.

16. The system of claim 12, wherein the indication comprises a topic of interest, the at least one processor further configured to:

categorize the generated one or more domain name suggestions based on a category of information provided by the information source; and provide the one or more domain name suggestions to the user based on a determination that the categorized one or more domain name suggestions correspond to the topic of interest.

17. The system of claim 12, wherein the at least one processor is further configured to:

score the term based on at least one of a number of registered domain names generated based on terms from the source, a popularity of the term among users, a frequency with which the term appears in the information source, or a frequency with which the term appears among a plurality of the one or more information sources; and provide the one or more domain name suggestions to the user in a list of domain name suggestions, the list of domain name suggestions being sorted to prioritize domain name suggestions based on the scores.

18. The system of claim 12, wherein the at least one processor is further configured to repeatedly identify one or more suggested domain names.

19. The system of claim 18, wherein the at least one processor is further configured to repeatedly identify one or more suggested domain names to identify trends in the use of terms.

20. The system of claim 19, wherein the at least one processor is further configured to periodically provide the one or more domain name suggestions to update the user with suggested domain names based on the trends.

21. The system of claim 18, wherein the at least one processor is further configured to:

store feedback information for improving identification of domain names that are likely to be registered, the feedback information comprising at least one of a number of registered domain names based on terms from different information sources, a number of registered domain names based on categories of terms, a frequency with which the term appears in one or more information sources, or a conversion rate of domain name suggestions to domain name registrations for one or more users; and input the feedback information into a machine-learning algorithm to improve the identification of suggested domain names.

* * * * *